United States Patent
Meguro et al.

(10) Patent No.: US 7,548,439 B2
(45) Date of Patent: Jun. 16, 2009

(54) ELECTRIC POWER CONVERTER FOR REDUCING GENERATED HIGH FREQUENCY COMPONENTS

(75) Inventors: Hikaru Meguro, Chiyoda-ku (JP); Hiroshi Ikarashi, Chiyoda-ku (JP); Keizo Shimada, Chiyoda-ku (JP); Masashi Toyota, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/092,672

(22) Filed: Mar. 30, 2005

(65) Prior Publication Data
US 2006/0227583 A1    Oct. 12, 2006

(51) Int. Cl.
*H02M 1/12* (2006.01)
*H02M 1/14* (2006.01)
*H02M 3/335* (2006.01)

(52) U.S. Cl. .............. 363/41; 363/40; 363/17; 363/98; 363/132

(58) Field of Classification Search .......... 363/40, 363/41, 37, 17, 98, 132
See application file for complete search history.

(56) References Cited

U.S. PATENT DOCUMENTS

| | | | | |
|---|---|---|---|---|
| 4,597,037 A | * | 6/1986 | Okado | 363/41 |
| 4,967,334 A | * | 10/1990 | Cook et al. | 363/34 |
| 5,047,910 A | * | 9/1991 | Levran et al. | 363/41 |
| 5,091,842 A | * | 2/1992 | Kawai | 363/98 |
| 5,526,252 A | * | 6/1996 | Erdman | 363/41 |
| 5,706,186 A | * | 1/1998 | Blasko | 363/41 |
| 6,208,537 B1 | * | 3/2001 | Skibinski et al. | 363/40 |
| 6,882,549 B2 | * | 4/2005 | Huggett et al. | 363/40 |
| 6,924,993 B2 | * | 8/2005 | Stancu et al. | 363/41 |

FOREIGN PATENT DOCUMENTS

| | | |
|---|---|---|
| JP | 64-55076 A | 3/1989 |
| JP | 03-218270 | 9/1991 |
| JP | 8-126368 A | 5/1996 |
| JP | 2004-248419 | 9/2004 |

OTHER PUBLICATIONS

Japanese Office Action dated May 2, 2006 (Two (2) pages).

* cited by examiner

*Primary Examiner*—Bao Q Vu
(74) *Attorney, Agent, or Firm*—Crowell & Moring LLP

(57) ABSTRACT

By reduction in loss and noise of a three-phase reactor on the AC side of an electric power converter, compactness and reduction in weight of the reactor are realized, and countermeasures for heat and noise are reduced, and a specific frequency component is reduced, thus cost reduction and conversion efficiency are improved, and carriers of a controller are prepared in correspondence to the phases of the electric power converter, and moreover a phase difference of each carrier is set properly.

17 Claims, 4 Drawing Sheets

ELECTRIC POWER CONVERTER FOR REDUCING GENERATED HIGH FREQUENCY COMPONENTS

FIELD OF THE INVENTION

The present invention relates to an electric power converter.

BACKGROUND OF THE INVENTION

In the electric power converter, for example, as shown in FIG. 1 of Japanese Patent Laid-open No. Hei 3 (1991)-218270, to remove high-frequency components generated in an AC line and a DC line, a capacitor is connected between the AC line and the DC line. The converter compares signal waves of respective phases having a phase difference from one carrier common to the respective phases, gives positive logic and negative logic high frequency pulses, which are output of comparators, to switching devices to control the PWM.

When a function for removing the high-frequency components generated in the AC line and DC line is provided, the following advantages can be obtained.

(1) Without insulating the AC line and electric power converter by a transformer, a leakage current Ir can be reduced.

(2) A high-frequency current leaking from the electric power converter is reduced, so that an EMI countermeasure can be taken.

SUMMARY OF THE INVENTION

However, there is a circuit through which an excessive high-frequency current $I_0$ flows, so that loss and noise of a reactor installed between the AC line and the DC line are increased.

An object of the present invention is to reduce the high-frequency current $I_0$, reduce the loss and noise of the reactor, and furthermore realize compactness, cost reduction, and improvement of the conversion efficiency of the electric power converter by reduction in the loss and noise.

The present invention installs a carrier source for each phase and gives a phase difference to a carrier of each phase.

Other objects, advantages and novel features of the present invention will become apparent from the following detailed description of the invention when considered in conjunction with the accompanying drawings.

DESCRIPTION OF THE PREFERRED EMBODIMENTS

Figure 1:
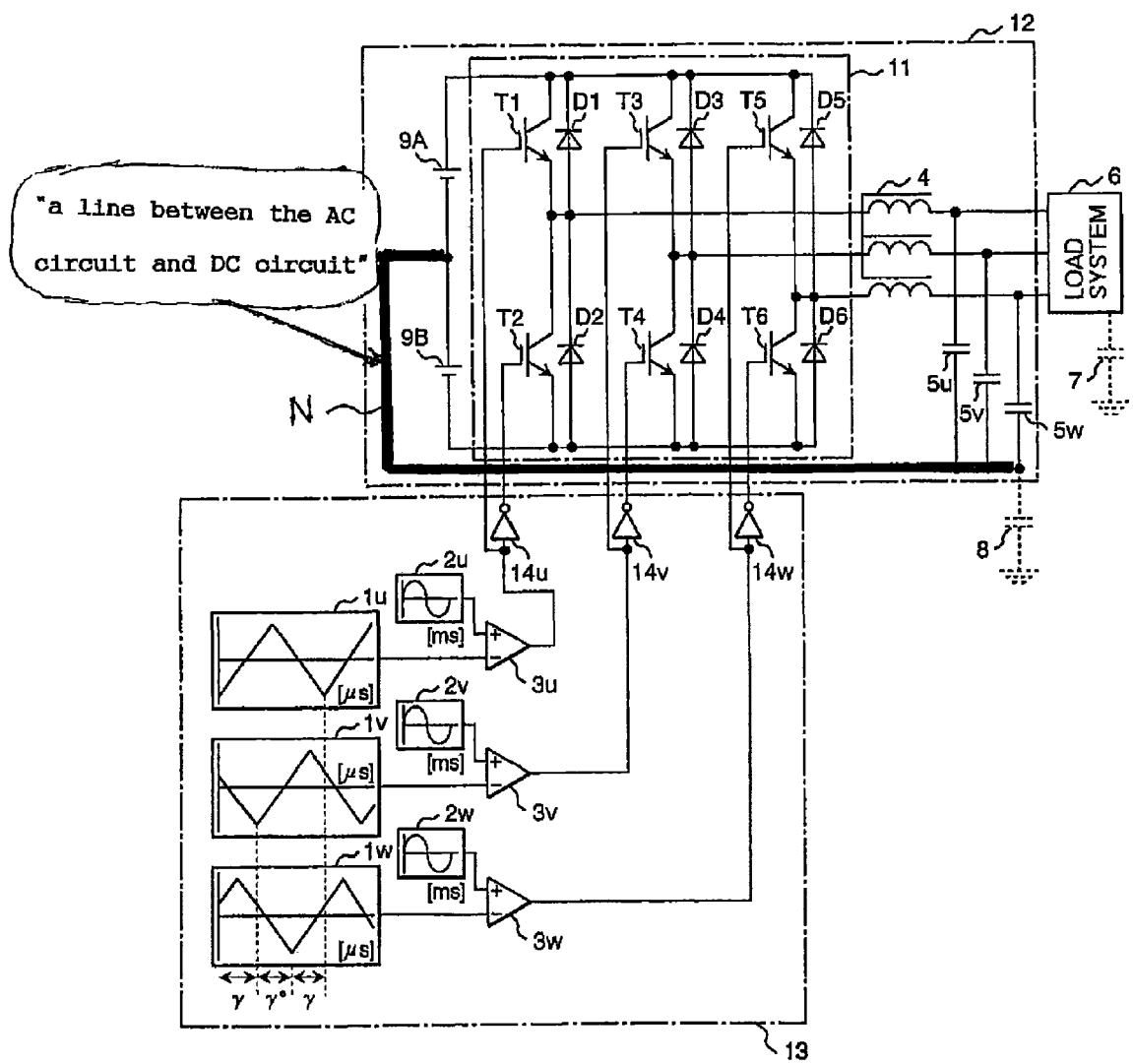
FIG. 1 is a schematic view of a three-phase three-wire inverter circuit.

FIG. 1 is a circuit diagram showing the electric power converter of an embodiment of the present invention, which is composed of a main circuit 12, a load system 6, and PMW controller 13. The main circuit 12 is structured so as to connect 6 switching devices T1, T2, T3, T4, T5, and T6 and diodes D1, D2, D3, D4, D5, and D6 connected respectively to the switching devices T1 to T6 in parallel as a three-phase bridge. To the DC side of the three-phase bridge circuit, DC power supplies 9A and 9B connected in series are connected.

The switching devices T1 to T6 of the main circuit 12 are driven by an on-off control signal for PWM (pulse width modulation) control given from the PWM controller 13 and function as a voltage source PWM converter.

The AC side of the main circuit 12 is connected to the load system 6 via the AC lines. The DC side of the main circuit 12 is connected to the AC side via the line N. Into the phases of the AC lines, reactors 4 are respectively inserted and between the AC lines of the reactors 4 on the load system side and the line N, capacitors 5u, 5v, and 5w are connected. In this embodiment, the line N is connected to the middle point of the DC power supplies 9A and 9B.

A high frequency filter is formed by these reactors 4 and the capacitors 5u, 5v, and 5w. In the PWM controller 13, according to the relative sizes of carriers 1u, 1v, and 1w and signal waves 2u, 2v, and 2w, comparators 3u, 3v, and 3w output an ON signal or an OFF signal.

The output of the comparators 3u, 3v, and 3w is supplied to the respective switching devices T1 to T6 directly or via NOT circuits 14u, 14v, and 14w. The frequency of the carriers 1u, 1v, and 1w is, for example, about 7 kHz. Between the load system 6 and the earth, a parasitic capacitor 7 is formed and between the electric power converter and the earth, a parasitic capacitor 8 is formed.

The output of the comparators 3u, 3v, and 3w is transferred to the switching devices T1 to T6 in a three-phase bridge circuit 11. Further, the carriers 1u, 1v, and 1w are given an optimal phase difference. The value of a phase difference γ of the carrier of each phase is decided by Formulas (8) and (9) as indicated below. Further, even if the phase difference of the carrier of each phase is set to the values other than those of Formulas (8) and (9), an effect can be obtained.

Figure 2:
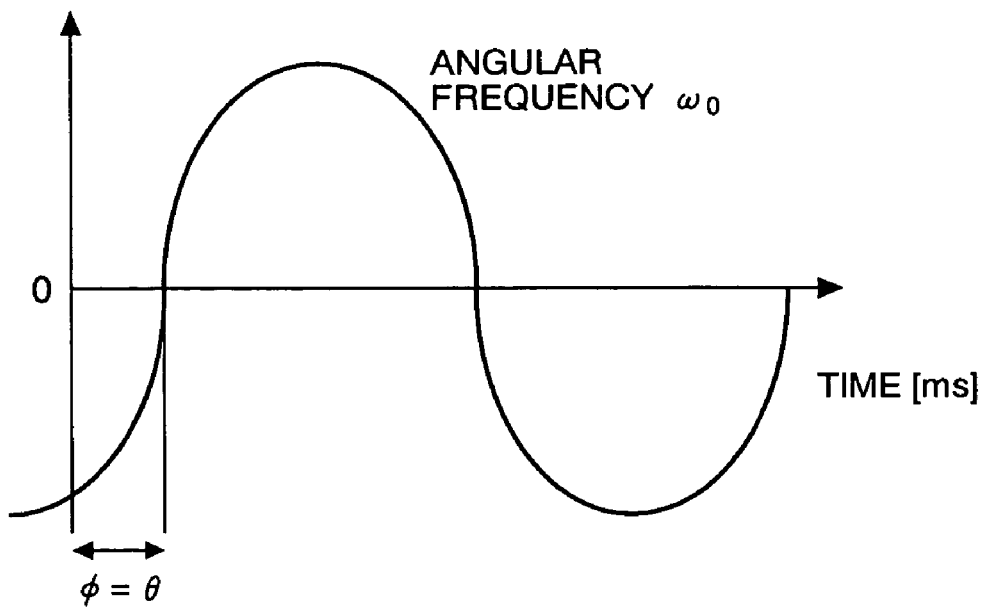
FIG. 2 is a drawing showing the phase relationship of the signal wave and carrier in the circuit shown in FIG. 1.
Figure 2:
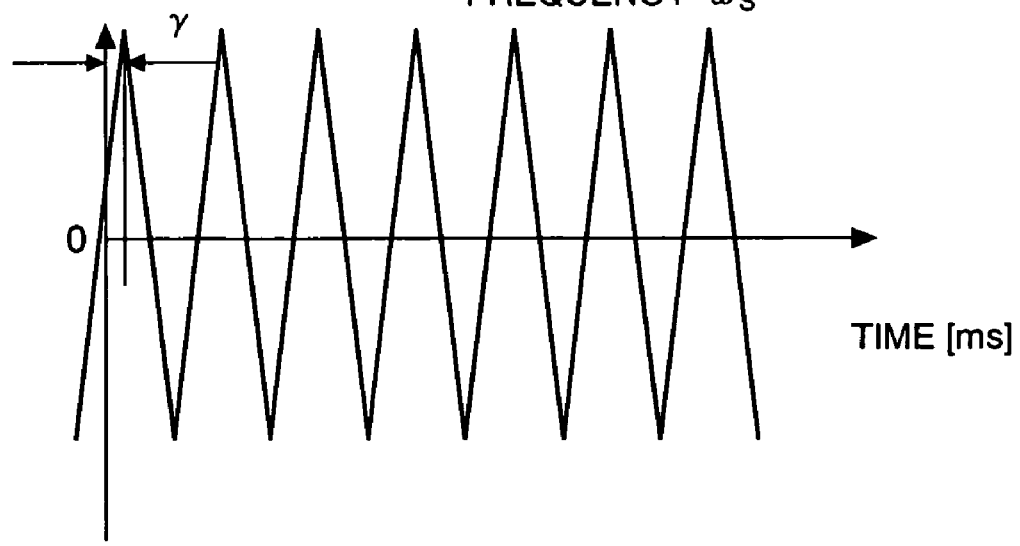

When a signal wave is set to a sine wave and a carrier is set to a triangle wave, the frequency component of each phase is given by Formulas (1) and (2) indicated below. In addition, the relation between the signal wave and carrier is shown in FIG. 2. (Reference: "Semiconductor Power Conversion Circuit, Electric Society, Semiconductor Electric Power Conversion System Investigation Committee", Electric Society, pp. 116-117; The same point of view as the reference can be used.)

When n=1, 3, 5, . . .

[Formula 1]

$$(-1)^{(n+1)/2}\left(\frac{4}{n\pi}\right) \quad (1)$$
$$\left[J_k\left(\frac{an\pi}{2}\right)\right]\{\cos((k\omega_0 + n\omega_S)t + k\phi) + \cos((k\omega_0 - n\omega_S)t + k\phi)\}$$

It is assumed that k=2λ and λ=0, 1, 2, 3, . . .
When n=2, 4, 6, . . .

[Formula 2]

$$(-1)^{n/2}\left(\frac{4}{n\pi}\right) \quad (2)$$
$$\left[J_k\left(\frac{an\pi}{2}\right)\right]\{\sin((k\omega_0 + n\omega_S)t + k\phi) + \sin((k\omega_0 - n\omega_S)t + k\phi)\}$$

It is assumed that k=2λ+1 and λ=0, 1, 2, 3, . . . .

n: degree of harmonics of carrier, k: degree of harmonics concerning signal wave, a: modification factor, $\omega_0$: angular frequency of signal wave, $\omega_s$: fundamental angular frequency of carrier wave, φ: phase of signal wave, Jk(x): Bessel function of the first kind)

In Formulas (1) and (2), the amplitude does not depend at all on the phase difference between the signal wave and the carrier. Therefore, only the phases in the sin and cos may be considered. Furthermore, in Formulas (1) and (2), in consideration of only the phase of the carrier, Formulas (3) to (5) indicated below are substituted for Formulas (1) and (2).

[Formula 3]

$$t=t'+\delta \tag{3}$$

$$\phi=-\omega_0\delta+\theta \tag{4}$$

$$\gamma=\omega_s\delta \tag{5}$$

δ: time difference of carrier, t': time, θ: phase difference of signal wave, γ: phase difference of carrier The inside of each of the items of cos and sin of Formulas (1) and (2) for which Formulas (3) to (5) indicated below are substituted is as indicated in Formula (6).

[Formula 4]

$$(k\omega_0 \pm n\omega_s)t + k\theta \pm n\gamma \tag{6}$$

In Formula (6), the part different in each phase is only the item of Formula (7).

$$k\theta \pm n\gamma \tag{7}$$

Furthermore, in consideration of only n=1 and k=0 which are main components of the harmonics of $I_0$, only γ remains. To negate the main components of the harmonics of $I_0$ by the phase difference γ of the carrier of each phase, when the phase difference γ calculated by Formula (8) is set in each phase, $I_0$ can be made smaller.

[Formula 5]

$$\gamma = \frac{2\pi q}{p} \tag{8}$$

p: phase of electric power converter
q: integer (for example, when p=3, q=. . . , −7, −5, −2, −1, +1, +2, +4, +5, +7, . . . ) meeting p≠0 in mode q Further, in $I_0$, to negate the frequency components other than n=1 and k=0, Formula (9) must be satisfied.

[Formula 6]

$$k\theta \pm n\gamma = \frac{2\pi q}{p} \tag{9}$$

The main circuit 12, according to the output of the comparators 3u, 3v, and 3w in the PWM controller 13, turns on or off the switching devices T1 to T6. The output of the DC power sources 9A and 9B, via the switching devices T1 to T6 and the diodes D1 to D6, is transferred to the three-phase AC reactor 4 as pulse-shaped power including the high-frequency component.

The capacitors 5u, 5v, and 5w connected to the three-phase AC reactor 4 return the high-frequency current flowing through the three-phase AC reactor 4 to the DC power sources 9A and 9B by the neutral line N. Furthermore, among the current flowing through the three-phase AC reactor 4, the smooth currents in which the high-frequency current is removed by the capacitors 5u, 5v, and 5w are transferred to the load system 6.

In FIG. 1, when the phase difference γ is set to 0 and in the same way as with FIG. 2, only n=1 and k=0, which are the main components of high frequency of $I_0$, are considered, $I_0$ is decided as shown in Formula (10).

[Formula 7]

$$\frac{3Ed/2}{\omega_S L}\left(-\frac{4}{\pi}\right)J_0\left(\frac{a\pi}{2}\right)\{2\cos(\omega_S t)\} \tag{10}$$

L: inductance per phase of three-phase reactor 4, Ed/2: voltage of DC power supplies 9A and 9B Further, the components of $I_0$ concerning n=1 and k=2 are negated in each phase, so that they are 0. When γ=2π/3 is applied from Formula (8), Formula (10) becomes 0. However, n=1 and k=2 which are negated mutually do not meet Formula (9), so that Formula (11) is obtained and they will not negate mutually. Further, in Formula (11), $\omega_s \gg \omega_0$ is set, so that the impedance of the three-phase reactor 4 per phase is approximate to $\omega_s L$.

[Formula 8]

$$\frac{3Ed/2}{\omega_S L}\left(-\frac{4}{\pi}\right)\left[J_2\left(\frac{a\pi}{2}\right)\{\cos((2\omega_0+\omega_S)t)+\cos((2\omega_0-\omega_S)t)\}\right] \tag{11}$$

In 0≦a≦1, the magnitude relations of the amplitude of Formulas (10) and (11) are as indicated in Formula (12), so that $I_0$ can be reduced.

[Formula 9]

$$\frac{3Ed/2}{\omega_S L}\left(-\frac{4}{\pi}\right)J_0\left(\frac{a\pi}{2}\right)\times 2 > \frac{3Ed/2}{(\omega_0+\omega_S)L}\left(-\frac{4}{\pi}\right)J_2\left(\frac{a\pi}{2}\right)\times \sqrt{2} \tag{12}$$

Figure 3:
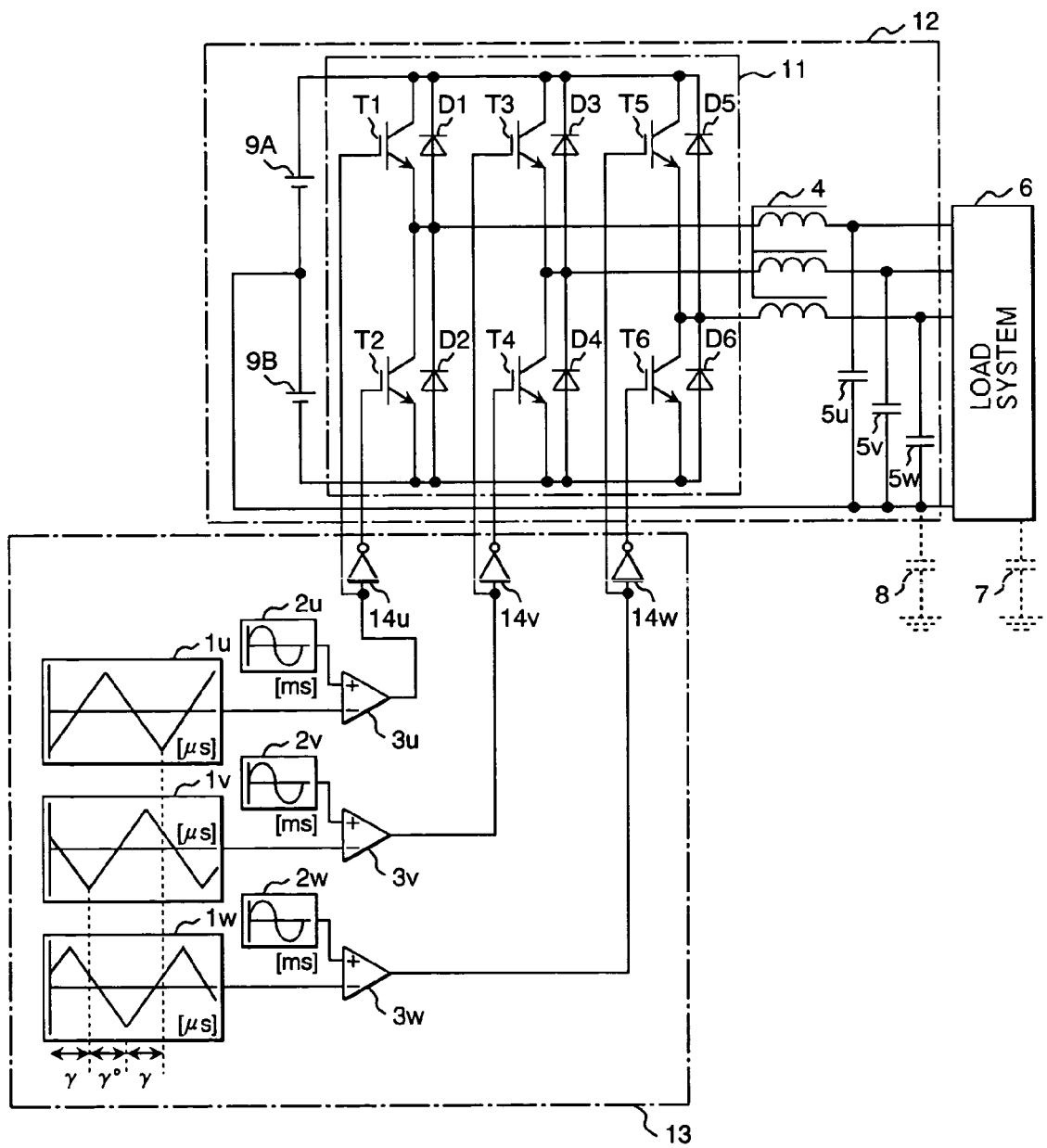
FIG. 3 is a schematic view of a three-phase four-wire inverter circuit when two DC power sources are used.
Figure 4:
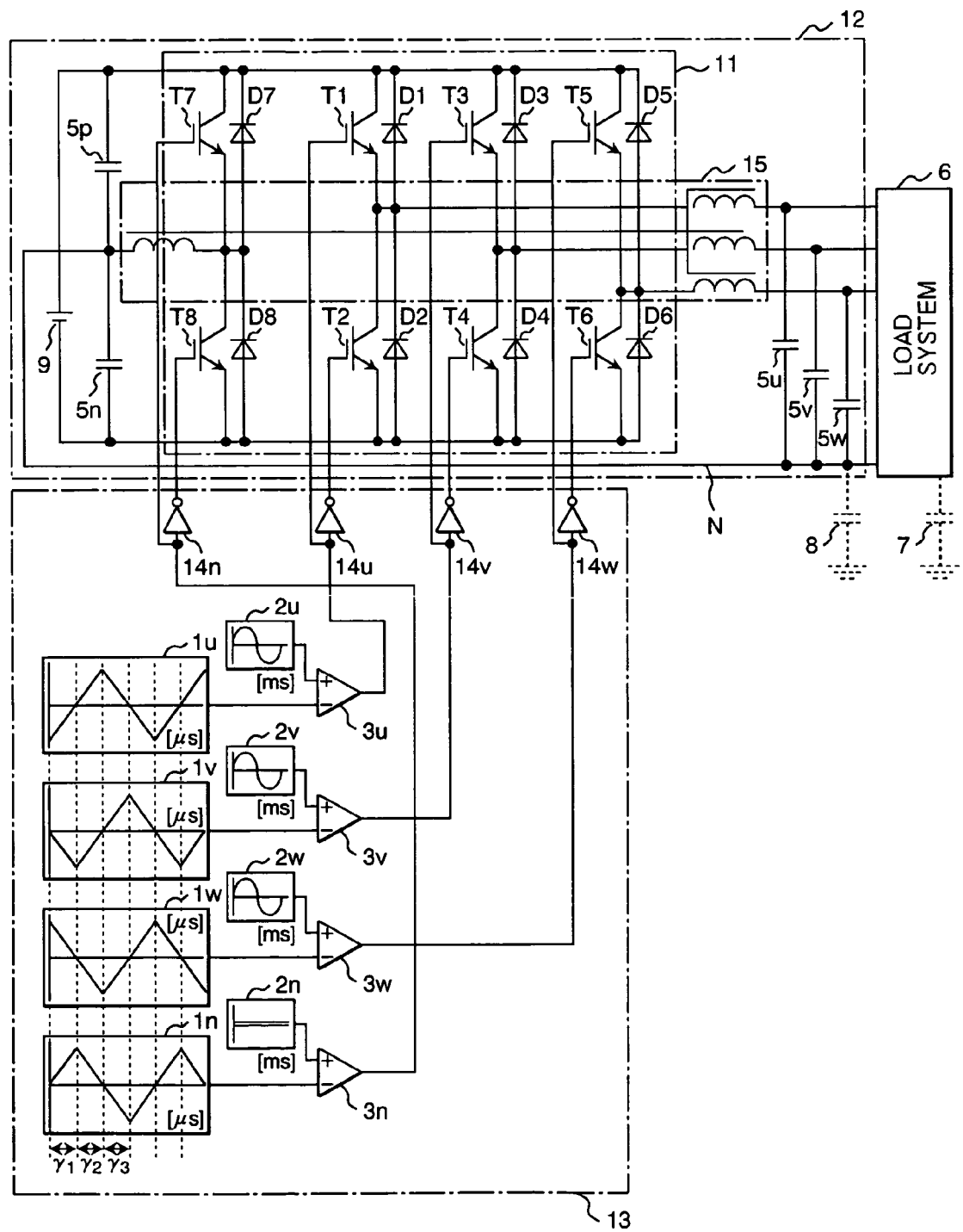
FIG. 4 is a schematic view of a three-phase four-wire inverter circuit when one DC power source is used.

The three-phase three-wire inverter circuit is described above. Next, an embodiment when the present invention is applied to the three-phase four-wire inverter circuit shown in FIG. 3 will be described. The difference between FIGS. 1 and 3 is that in FIG. 1, the neutral line N is not connected to the load system 6, while in FIG. 3, the neutral line N is connected to the load system 6. In FIG. 3, the different part from FIG. 1 will be explained mainly, though the main realization is the same as that shown in FIG. 1. In FIG. 3, the neutral phase N is formed using the two DC power supplies 9A and 9B. Depending on the conditions of the power sources, only one power source may require the three-phase four-wire inverter circuit. When only one power source requires the three-phase four-wire inverter circuit, the capacitors 5p and 5n shown in FIG. 4 form the neutral phase N. However, when a large common-mode current flows, the voltages of the capacitors 5p and 5n are unbalanced and a problem arises that the output voltage waveform is distorted. Therefore, in FIG. 4, one arm is added (switching devices T7, T8, D7, and D8 are added) and the balance of the voltages of the capacitors 5p and 5n is controlled. The differences between FIGS. 3 and 4 are as indicated in (1) to (4) described below.

(1) Addition of one arm (addition of switching devices T7, T8, D7, and D8)

(2) Addition of controller for one arm (addition of carrier 1n, etc.)

(3) Four-phase reactor 15 (three-phase reactor 4 shown in FIG. 3)

(4) Addition of capacitors 5p and 5n

When the present invention is applied to the circuit shown in FIG. 4, by selection of the phase differences γ1 to γ3 of the carrier so that the common-mode current of high frequency flowing through the four-phase reactor 15 shown in FIG. 4 is minimized, the loss and noise of the reactor can be reduced.

By change of structure only of the controller, the loss and noise of the reactor can be reduced, thus compactness and reduction in weight of the reactor can be realized and countermeasures for heat and noise can be reduced. Furthermore, a specific frequency component can be reduced, so that an EMI countermeasure can be taken. Therefore, cost reduction and improvement of the conversion efficiency can be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric power converter for switching a plurality of switching devices connected between an AC line and a DC line operated by respective high frequency pulses outputted from a controller so as to be switched synchronously with the respective pulses and converting electric power from a DC circuit to a multi-phase AC circuit or from said multi-phase AC circuit to said DC circuit, the switching devices being provided corresponding to the phases, wherein a reactor is inserted into each phase of said AC line such that a load system side of each reactor is operatively connected with a terminal of an associated capacitor being connected to a line between the AC circuit and DC circuit so as to form a high frequency filter for absorbing generated high frequency waves, the line connecting the AC circuit and DC circuit so as to bypass the switching devices, and said controller compares output of a plurality of carrier sources with output of a signal wave source and supplies high frequency pulses which are output of said comparison to said switching device, and phases of said plurality of carrier sources have predetermined phase differences so as to reduce a synthetic harmonic current of the line between the AC circuit and DC circuit, wherein each of said plurality of carrier sources comprises a triangular waveform.

2. An electric power converter comprising a main electric power conversion circuit bridge-connecting a plurality of switching devices, a control circuit for switching said switching device operated by respective high frequency pulses outputted from a controller so as to be switched synchronously with the respective pulses and converting electric power between a direct current and an alternating current, the switching devices being provided corresponding to the phases, and a high frequency filter formed by inserting a reactor into each phase of an AC line connected to said main electric power conversion circuit and by connecting a side of said reactor that is on an opposite side of said main electric power conversion circuit to a terminal of an associated capacitor and another terminal of each associated capacitor to a line between AC and DC sides of the main electric power conversion circuit for absorbing generated high frequency waves, the line connecting the AC circuit and DC circuit so as to bypass the switching devices, wherein said controller compares output of a plurality of carrier sources with output of a signal wave source and supplies high frequency pulses which are output of said comparator to said switching device, and phases of said plurality of carriers have predetermined phase differences so as to reduce a synthetic harmonic current of the line between the AC circuit and DC circuit, wherein each of said plurality of carrier sources comprises a triangular waveform.

3. An electric power converter according to claim 2, wherein said controller is configured for inputting an AC output voltage and controlling a PWM of said switching device so as to keep said AC output voltage at a predetermined value and said main electric power conversion circuit is a voltage type inverter.

4. An electric power converter for switching a plurality of switching devices connected between an AC line and a DC line operated by respective high frequency pulses outputted from a controller so as to be switched synchronously with the respective pulses, thereby converting electric power from a direct current to an alternating current or from said alternating current to said direct current, wherein a high frequency filter is provided and comprised of a reactor arranged in each phase of said AC line so that a side of each reactor is operatively connected to a terminal of an associated capacitor with another terminal of each associated capacitor operatively connected to a line between AC and DC sides for absorbing generated high frequency waves generated, the line connecting the AC circuit and DC circuit so as to bypass the switching devices, the switching devices being provided corresponding to the phases, and said controller adjusts optimally phase differences of a plurality of carrier sources, compares output of a signal wave source, and supplies high frequency pulses which are output of said comparator to said switching device so as to reduce a synthetic harmonic current of the line between the AC circuit and DC circuit, wherein each of said plurality of carrier sources comprises a triangular waveform.

5. An electric power converter according to claim 1, wherein said switching device controls one phase as a neutral phase.

6. An electric power converter according to claim 2, wherein said switching device controls one phase as a neutral phase.

7. An electric power converter according to claim 3, wherein said switching device controls one phase as a neutral phase.

8. An electric power converter according to claim 4, wherein said switching device controls one phase as a neutral phase.

9. An electric power converter according to claim 1, wherein the supplied high frequency pulses comprise positive logic and negative logic pulses.

10. An electric power converter according to claim 2, wherein the supplied high frequency pulses comprise positive logic and negative logic pulses.

11. An electric power converter according to claim 4, wherein the supplied high frequency pulses comprise positive logic and negative logic pulses.

12. A method for switching between an AC line and a DC line by respective high frequency pulses converting power between an AC circuit and a DC circuit, comprising:

absorbing high frequency waves generated by the switching by inserting a reactor into each phase of the AC line and connecting one side of each reactor that is opposite switching circuits to a terminal of an associated capacitor and connecting another terminal of each associated capacitor to a line between the AC and DC circuits, the line connecting the AC circuit and DC circuit so as to bypass the switching devices, so as to reduce a synthetic harmonic current of the line between the AC circuit and DC circuit, wherein said switching circuits being provided corresponding to the phases, and wherein said switching being synchronized by said respective pulses, and wherein output of a plurality of carrier sources is compared with output of a signal wave source, with the phases of said carrier sources having predetermined phase differences, and outputting the high frequency pulses, wherein each of said plurality of carrier sources comprises a triangular waveform.

13. A method according to claim 12, wherein one phase is controlled as a neutral phase.

14. A method according to claim 12, wherein the supplied high frequency pulses comprise positive logic and negative logic pulses.

15. An electric power converter according to claim 1, further comprising switching devices arranged for each phase.

16. An electric power converter according to claim 1, further comprising capacitors arranged for each phase.

17. An electric power converter according to claim 16, wherein a line between the AC circuit and DC circuit is formed with a common line from the capacitors arranged for each phase to DC side.

* * * * *